United States Patent
Moran et al.

(10) Patent No.: US 10,229,606 B2
(45) Date of Patent: Mar. 12, 2019

(54) CONTROLLERS AND AIRCRAFT WITH PITCH AND FLIGHT PATH BASED FLIGHT DIRECTOR MODES

(71) Applicant: Gulfstream Aerospace Corporation, Savannah, GA (US)

(72) Inventors: Brendan Moran, Savannah, GA (US); Scott Buethe, Savannah, GA (US); Andrew Martin, Savannah, GA (US); Todd Abler, Savannah, GA (US); Thomas Horne, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 86 days.

(21) Appl. No.: 15/246,238

(22) Filed: Aug. 24, 2016

(65) Prior Publication Data
US 2018/0061250 A1    Mar. 1, 2018

(51) Int. Cl.
  *G08G 5/00*   (2006.01)
  *G07C 5/08*   (2006.01)
  *B64D 43/00*  (2006.01)
  *G01C 23/00*  (2006.01)

(52) U.S. Cl.
  CPC .......... *G08G 5/0065* (2013.01); *B64D 43/00* (2013.01); *G01C 23/00* (2013.01); *G07C 5/0825* (2013.01); *G08G 5/0021* (2013.01); *G08G 5/0052* (2013.01)

(58) Field of Classification Search
  CPC .... G08G 5/0065; G08G 5/0052; B64D 43/00; G07C 5/0825
  See application file for complete search history.

(56) References Cited

U.S. PATENT DOCUMENTS

| | | | |
|---|---|---|---|
| 2006/0220921 A1* | 10/2006 | Foucart | G05D 1/0808 340/975 |
| 2012/0299753 A1 | 11/2012 | Thoreen | |
| 2012/0316706 A1 | 12/2012 | Guedes et al. | |
| 2013/0169450 A1* | 7/2013 | He | G01C 23/005 340/971 |
| 2015/0211883 A1* | 7/2015 | He | G05D 1/0858 340/946 |

OTHER PUBLICATIONS

German Patent and Trade Mark Office, Search Report for German Patent Application No. 10 2017 119 044.9 dated May 2, 2018.

* cited by examiner

*Primary Examiner* — Anne M Antonucci
(74) *Attorney, Agent, or Firm* — LKGlobal | Lorenz & Kopf, LLP

(57) ABSTRACT

Avionics systems, controllers, and aircraft are provided. An avionics system includes a display unit and a controller, and an aircraft includes the avionics system. The display unit is configured to present an image. The controller is communicatively coupled with the display unit and is configured to control the display unit to present the image in a takeoff mode and in a flight mode of the controller. The controller is further configured to receive signals indicating an aircraft attitude, a target attitude, and an aircraft flight path, to generate a marker in the image in the takeoff mode based on an attitude difference between the aircraft attitude and the target attitude, to generate the marker in the image in the flight mode based on the aircraft flight path, and to generate a signal that causes the display unit to present the image.

20 Claims, 4 Drawing Sheets

CONTROLLERS AND AIRCRAFT WITH PITCH AND FLIGHT PATH BASED FLIGHT DIRECTOR MODES

TECHNICAL FIELD

The technical field relates generally to flight director guidance of aircraft, and more particularly relates to avionics systems, controllers, and aircraft with pitch based flight director guidance in a takeoff mode and flight path based flight director guidance in a flight mode.

BACKGROUND

During takeoff of an airplane, the pilot must accurately rotate the airplane to a pitch attitude target without under or over-rotating. Accurate rotation achieves optimal take-off field performance and promotes safety of the passengers and crew. A flight director is an avionics feature that generates images on a flight display unit to help the pilot accurately fly the airplane through the various modes of flight. Pilots typically position a flight path marker or a pitch marker on a flight director indicator to achieve the desired rotation during takeoff. Flight path markers, however, are based on the flight path of the airplane. The flight path of the airplane is dissociated from the pitch based rotation task, leaving room for improvement of takeoff performance with flight path based flight directors. Pitch based flight directors are better suited for takeoff performance over flight path based flight directors, but pitch based flight directors provide sub-optimal guidance once the airplane is in flight.

As such, it is desirable to provide avionics systems, controllers, and aircraft that provide improved flight director guidance across pitch and flight path based flight tasks. In addition, other desirable features and characteristics will become apparent from the subsequent summary and detailed description, and the appended claims, taken in conjunction with the accompanying drawings and this background.

SUMMARY

Various non-limiting embodiments of avionics systems, controllers for avionics systems, and aircraft are disclosed herein.

In a first non-limiting embodiment, an avionics system includes, but is not limited to, a display unit and a controller. The display unit is configured to present an image. The controller is communicatively coupled with the display unit and is configured to control the display unit to present the image in a takeoff mode and in a flight mode of the controller. The controller is further configured to receive signals indicating an aircraft attitude, a target attitude, and an aircraft flight path, to generate a marker in the image in the takeoff mode based on an attitude difference between the aircraft attitude and the target attitude, to generate the marker in the image in the flight mode based on the aircraft flight path, and to generate a signal that causes the display unit to present the image.

In a second non-limiting embodiment, a controller for an avionics system includes, but is not limited to, a processor and a memory unit. The memory unit is operatively coupled with the processor contains instructions. The instructions and the processor cooperate to configure the controller to control a display unit to present an image in a takeoff mode and in a flight mode of the controller. The instructions and the processor further cooperate to configure the controller to receive signals indicating an aircraft attitude, a target attitude, and an aircraft flight path. The instructions and the processor yet further cooperate to configure the controller to generate a marker in the image in the takeoff mode based on an attitude difference between the aircraft attitude and the target attitude indicating an aircraft pitch rotation target, to generate the marker in the image in the flight mode based on the aircraft flight path, and to generate a signal that causes the display unit to present the image.

In a third non-limiting embodiment, an aircraft includes, but is not limited to, an aircraft control handle, a display unit, and a controller. The aircraft control handle is configured to receive control movements for attitude adjustment in the aircraft. The display unit is configured to present an image. The controller is communicatively coupled with the display unit and is configured to control the display unit to present the image in a takeoff mode and in a flight mode of the controller. The controller is further configured to receive signals indicating an aircraft attitude, a target attitude, and an aircraft flight path. The controller is yet further configured to generate a marker in the image in the takeoff mode based on an attitude difference between the aircraft attitude and the target attitude, to generate the marker in the image in the flight mode based on the aircraft flight path, and to generate a signal that causes the display unit to present the image.

BRIEF DESCRIPTION OF DRAWINGS

Advantages of the present embodiments will be readily appreciated as the embodiments becomes better understood by reference to the following detailed description, when considered in connection with the accompanying drawings wherein.

DETAILED DESCRIPTION

Figure 1:
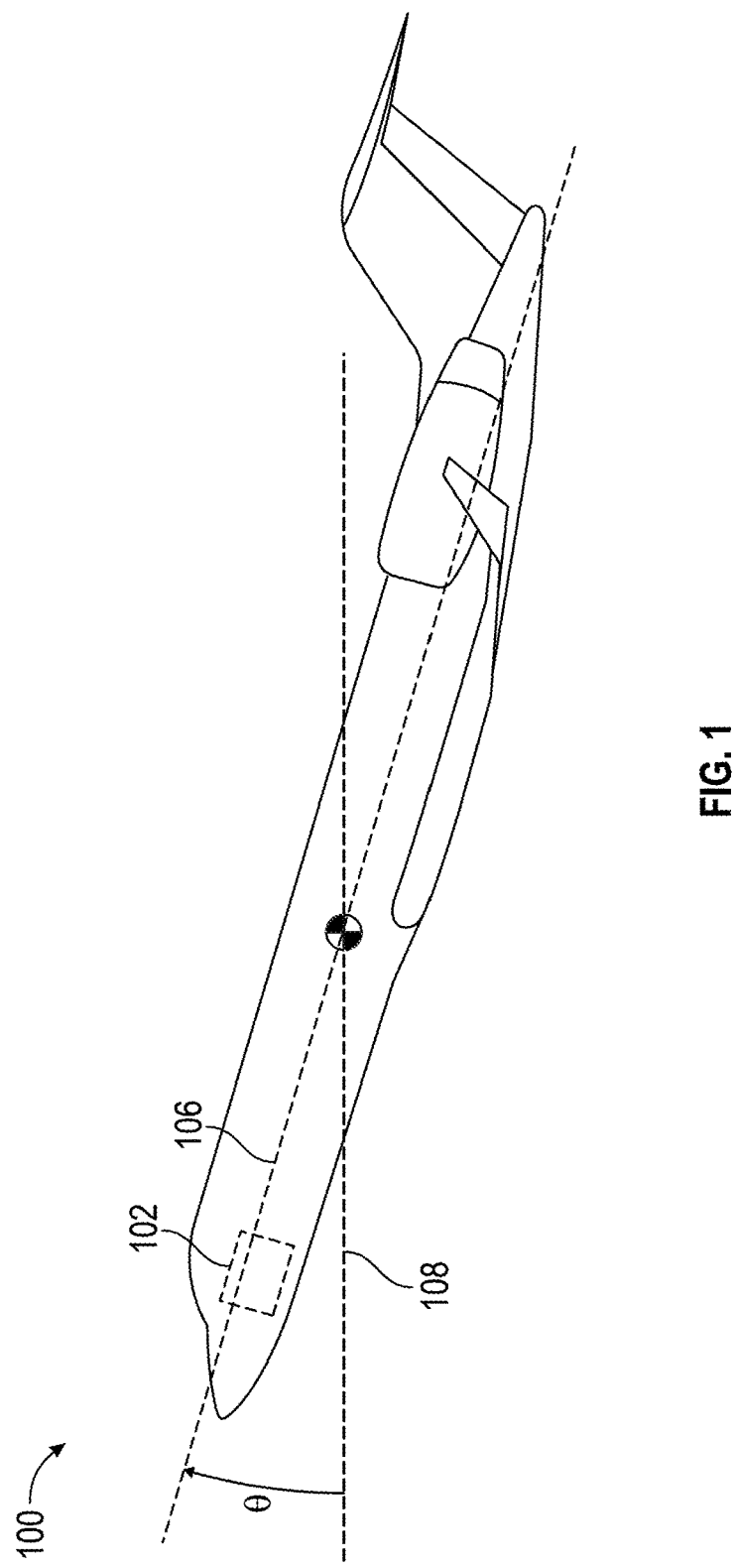
FIG. 1 is a simplified diagram illustrating a non-limiting embodiment of an aircraft in accordance with the teachings of the present disclosure.

The following detailed description is merely exemplary in nature and is not intended to limit the invention or the application and uses of the invention. Furthermore, there is no intention to be bound by any theory presented in the preceding background or the following detailed description.

Various non-limiting embodiments of avionics systems, controllers for avionics systems, and aircraft are provided. In general, the disclosure herein describes a flight guidance system design to be used during the take-off phase of flight. During take-off, the pilot must accurately rotate the aircraft to a pitch attitude target without under or over-rotating. The flight guidance design provides guidance to achieve this pitch-based task and smoothly transition into providing flight path-based guidance using a single set of display cues.

During takeoff, the flight guidance system will provide guidance representing the difference in the rotation pitch attitude target ($\theta$Target) and the aircraft pitch attitude ($\theta$). The error to the rotation pitch attitude target $\theta$-$\theta$Target is represented in the drawing figures as the angular distance from the flight path/pitch marker to the flight director indicator. A flight director indicator is placed at a fixed location on the display system pitch scale and the flight path/pitch marker is placed at a relative vertical distance based on the error to the rotation pitch attitude target. A greater understanding may be obtained from reference to the drawings.

FIG. 1 is a side view illustrating an aircraft 100 in flight. Aircraft 100 has a pitch attitude θ that indicates the longitudinal orientation 106 of aircraft 100 relative to a horizon 108, as will be appreciated by those with ordinary skill in the art. Aircraft 100 includes an avionics system 102 that performs various flight related tasks.

Figure 2:
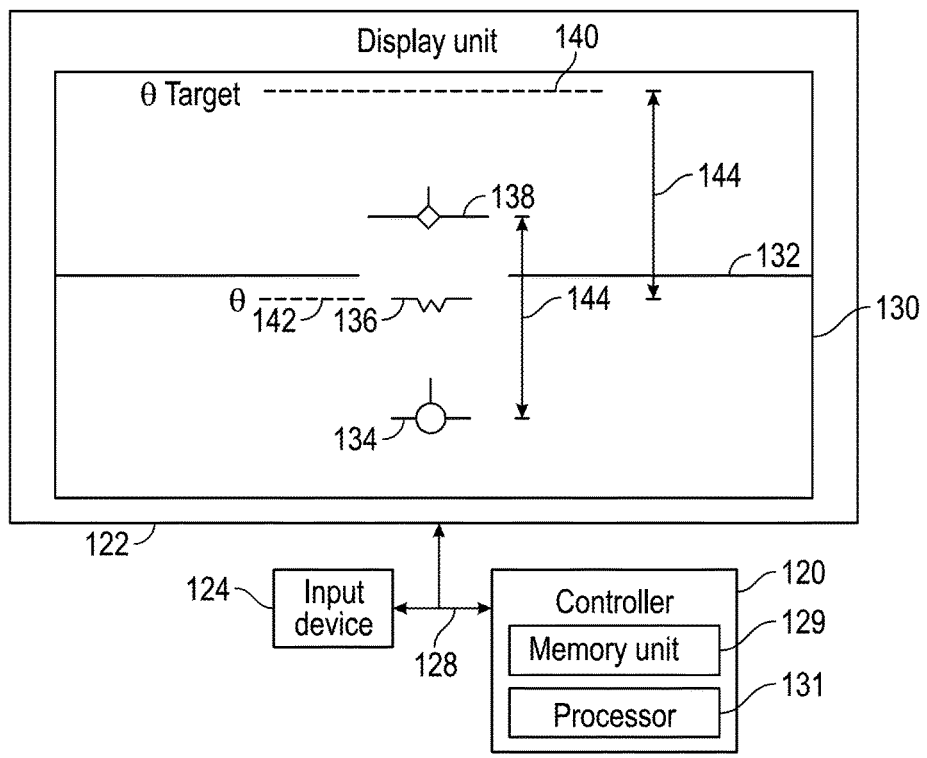
FIG. 2 is a simplified block diagram illustrating a non-limiting embodiment of an avionics system of the aircraft illustrated in FIG. 1.
Figure 3:
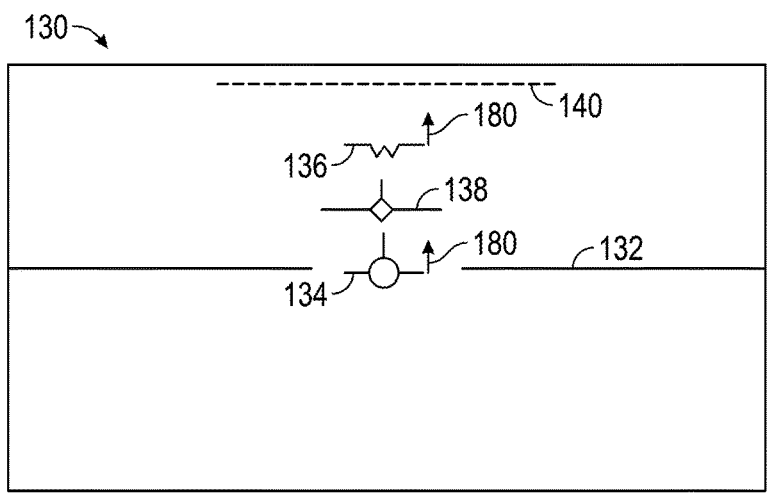
FIGS. 3, 4, and 5 are illustrations of images presented by the avionics system of FIG. 2.

Referring now to FIG. 2, a block diagram illustrates avionics system 102. Avionics system 102 includes a controller 120, a display unit 122, and a user input device 124. An interconnect 128 communicatively couples controller 120, display unit 122, and user input device 124 for electronic communication. In the example provided, interconnect 128 is a communication or network bus, as will be appreciated by those with ordinary skill in the art. It should be appreciated that any suitable network topology or physical medium may be utilized for electronic communication in avionics system 102.

Controller 120 is a hardware device that carries out instructions of a computer program. In the example provided, controller 120 is configured to execute the computer program to provide the functions of a conventional flight guidance system (FGS) in addition to performing the operations described in connection with FIG. 2. Controller 120 may be implemented with one or more central processing units ("CPUs"), a microprocessor, an application specific integrated circuit ("ASIC"), a microcontroller, and/or other suitable device. Controller 120 includes one or more memory units 129 that store electronic data and computer programs. For example, memory units 129 may be flash memory, spin-transfer torque random access memory (STT-RAM), magnetic memory, phase-change memory (PCM), dynamic random access memory (DRAM), or other suitable electronic storage media. In the example provided, memory units 129 store control logic with instructions that cooperate with a processor 131 of controller 120 to perform operations of the method described below. For example, processor 131 may execute the instructions stored in memory units 129. Furthermore, controller 120 may utilize multiple hardware devices as is also appreciated by those skilled in the art. Controller 120 has a takeoff mode and a flight mode in which pilot guidance is generated for presentation on display unit 122 based on different factors, as will be described below. Controller 120 is configured to control display unit 122 to present the image in the takeoff mode and in the flight mode.

In the example provided, user input device 124 is an aircraft control handle configured to receive control movements for attitude adjustment of aircraft 100. For example, user input device 124 may be a side stick controller or a yoke for accepting pilot commands during manual flight of aircraft 100. In the example provided, the pilot commands are communicated to a hydraulic actuator, which moves an elevator of aircraft 100 to achieve the attitude adjustment.

Display unit 122 is an electronic display that is electronically coupled with controller 120 to visually present information and data in an image 130 according to electronic signals generated by controller 120 and communicated to display unit 122. For example, display unit 122 may include cathode ray tubes ("CRT"), light-emitting diodes ("LED"), plasma panels, liquid crystal displays ("LCD"), projected images from a Digital Light Processing ("DLP") projector, and/or any other suitable electronic display technology.

With continuing reference to FIG. 2, FIGS. 3-5 are schematic views illustrating progression of image 130 during a takeoff of aircraft 100. Image 130 includes a horizon indicator 132, a marker 134, a waterline symbol 136, and a flight director indicator 138. Horizon indicator 132 represents the horizon, waterline symbol 136 represents a pitch attitude of aircraft 100, and flight director indicator 138 represents a target for marker 134. Marker 134 represents a flight path or a difference between a pitch target and the aircraft pitch attitude in various modes of controller 120, as will be described below. In the example provided, a target attitude 140, an aircraft attitude 142 corresponding with aircraft pitch attitude θ, and an attitude difference 144 are not presented on image 130, but are illustrated in FIGS. 2-5 to further describe the operations of controller 120, as discussed below with reference to FIG. 6.

With continuing reference to FIGS. 2-5, FIG. 6 is a flow diagram illustrating a method 200 of providing flight director guidance to a pilot during a takeoff procedure. Operations of method 200 are performed by controller 120. Controller 120 includes control logic with instructions stored in memory unit 129 that cooperate with processor 131 to cause controller 120 to perform the operations of method 200. It should be appreciated that operations of method 200 may alternatively be performed by other controllers or devices.

Controller 120 receives signals indicating an aircraft attitude, a target attitude, and an aircraft flight path in operation 210. Aircraft attitude is the pitch attitude θ of aircraft 100, the aircraft flight path represents the trajectory of aircraft 100, and target attitude is the recommended rotation for achieving takeoff of aircraft 100. Target attitude may be fixed for all aircraft loading and conditions or may be computed based on current conditions and loading. For example, target attitude may be computed based on the aircraft gross weight, altitude, temperature, configuration, runway slope, other factors which can result in improved aircraft field performance, or combinations thereof.

Controller 120 generates a horizon and a waterline indicating the aircraft attitude in the image in operation 212. In the example provided, the controller is configured to generate waterline 136 below target attitude 140 by a distance corresponding to attitude difference 144 between the target attitude and the aircraft attitude.

Controller 120 determines whether a takeoff mode is active in operation 214. Takeoff mode is active when controller 120 anticipates that the next attitude adjustment will be to rotate aircraft 100 from having nose gear wheels on the ground to elevating nose gear wheels above the ground. For example, controller 120 may determine that the takeoff mode is active based on input from a flight guidance system or flight director, based on whether aircraft weight is detected at landing gear of aircraft 100, based on an altimeter reading, based on other takeoff indicators, or based on combinations thereof. In the example provided, controller 120 activates takeoff mode at startup of controller 120. In some embodiments, controller 120 may activate the takeoff mode upon de-rotation in a "touch and go" operation where aircraft 100 is expected to rotate and takeoff again, as will be appreciated by those with ordinary skill in the art. In the example provided, controller 120 is configured to generate the marker in the image in the takeoff mode in response to determining that a pitch rotation at takeoff has not yet occurred.

When controller 120 is in the takeoff mode, method 200 proceeds to operation 215 to generate a flight director indicator at a fixed position in the image. In the example provided, the fixed position is selected based on a minimum takeoff gradient. Method 200 proceeds to operation 216 to generate a marker in the image based on an attitude difference between the aircraft attitude and the target attitude. In the example provided, the controller is configured to generate the marker in the image in the takeoff mode below the flight director indicator a distance corresponding to attitude difference 144. Accordingly, during aircraft rotation the pilot will use pilot inceptor controls to position marker 134 directly over the top of flight director indicator 138, which rotates the aircraft to the rotation attitude target.

Controller 120 determines whether to transition between the takeoff mode and the flight mode in operation 220. For example, controller 120 may transition in response to at least one of a weight off wheels indication, an airspeed indication, an altitude indication, or combinations thereof. In the example provided, controller 120 begins the transition to the flight mode at a specified time after weight off wheels.

When controller 120 is in transition, controller 120 transitions between the takeoff mode and the flight mode by transitioning the marker from the attitude difference to the aircraft flight path based guidance in operation 230. Controller 120 transitions the flight director indicator from the fixed position to the target flight path based guidance in operation 232. In some embodiments, the transition is achieved by changing the inputs into a complementary filter, as will be appreciated by those with ordinary skill in the art. In some embodiments, the transition moves the marker at a rate of 0.1 G per second. When controller 120 is not in transition, method 200 proceeds to operation 234.

When controller 120 is not in the takeoff mode, then controller 120 is in flight mode and method 200 proceeds to operation 222 to generate the marker in the image based on the aircraft flight path. Controller 120 generates the flight director indicator in the image based on a target flight path in operation 224. For example, the in-air flight path angle target represented by the marker in the flight mode may be determined in order to achieve a target airspeed or to continue at a fixed pitch attitude. Controller 120 proceeds from operation 224 to operation 234.

Controller 120 generates a display signal that causes a display unit to present the image in operation 234. For example, controller 120 may generate a video signal or information for a separate video processor to cause display unit 122 to present image 130.

With continuing reference to FIGS. 2-5, an example of presentation of image 130 throughout takeoff will now be described. Image 130 in FIG. 2 illustrates a condition where aircraft 100 has not yet rotated during takeoff. For example, aircraft 100 may not have rotated when a pilot of aircraft 100 is initially increasing throttle at the beginning of a runway. As described above, controller 120 is in the takeoff mode where a distance between marker 134 and flight director indicator 138 indicates attitude difference 144.

As aircraft 100 increases speed and proceeds down the runway, the pilot pulls back on the flight control inceptor to rotate aircraft 100. As aircraft 100 rotates, the aircraft pitch increases. Accordingly, waterline symbol 136 and marker 134 move up in image 130 by an amount corresponding to the decrease in attitude difference 144, as indicated by movement arrows 180 in FIG. 3.

Figure 4:
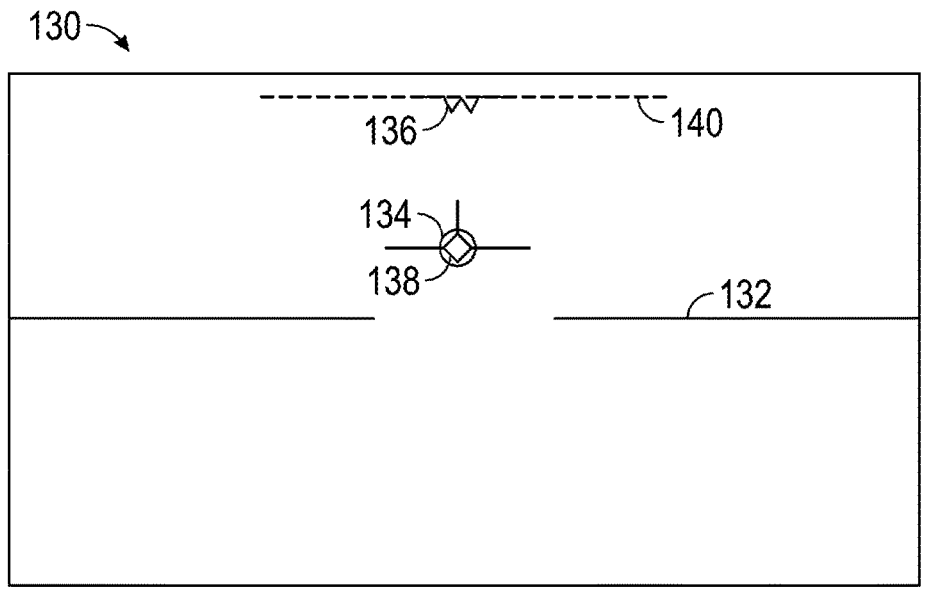

The pilot rotates aircraft 100 until marker 134 is located directly on flight director indicator 138, as illustrated in FIG. 4. When marker 134 is located directly on flight director indicator 138, attitude difference 144 is zero and the pilot has obtained the pitch target.

Figure 5:
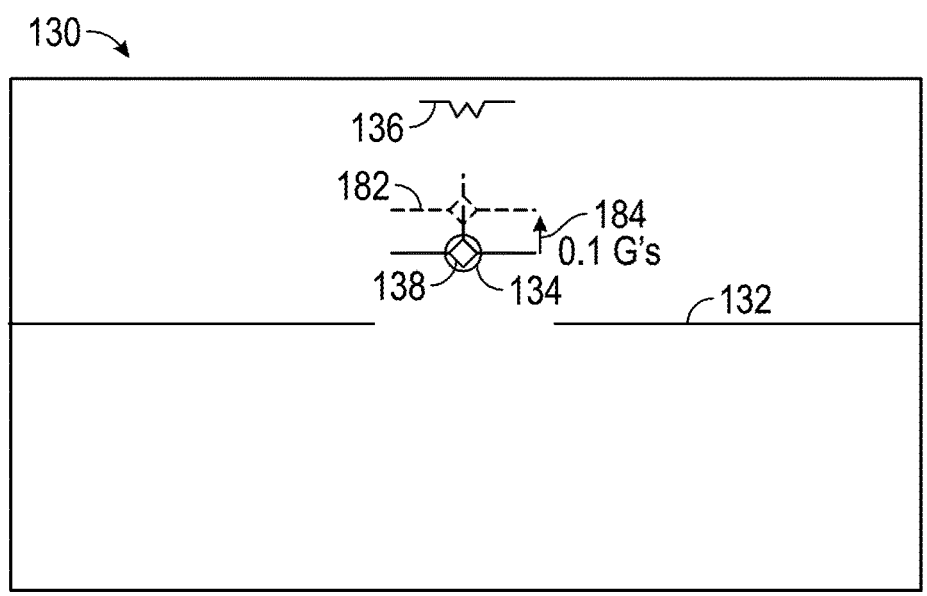
Figure 6:
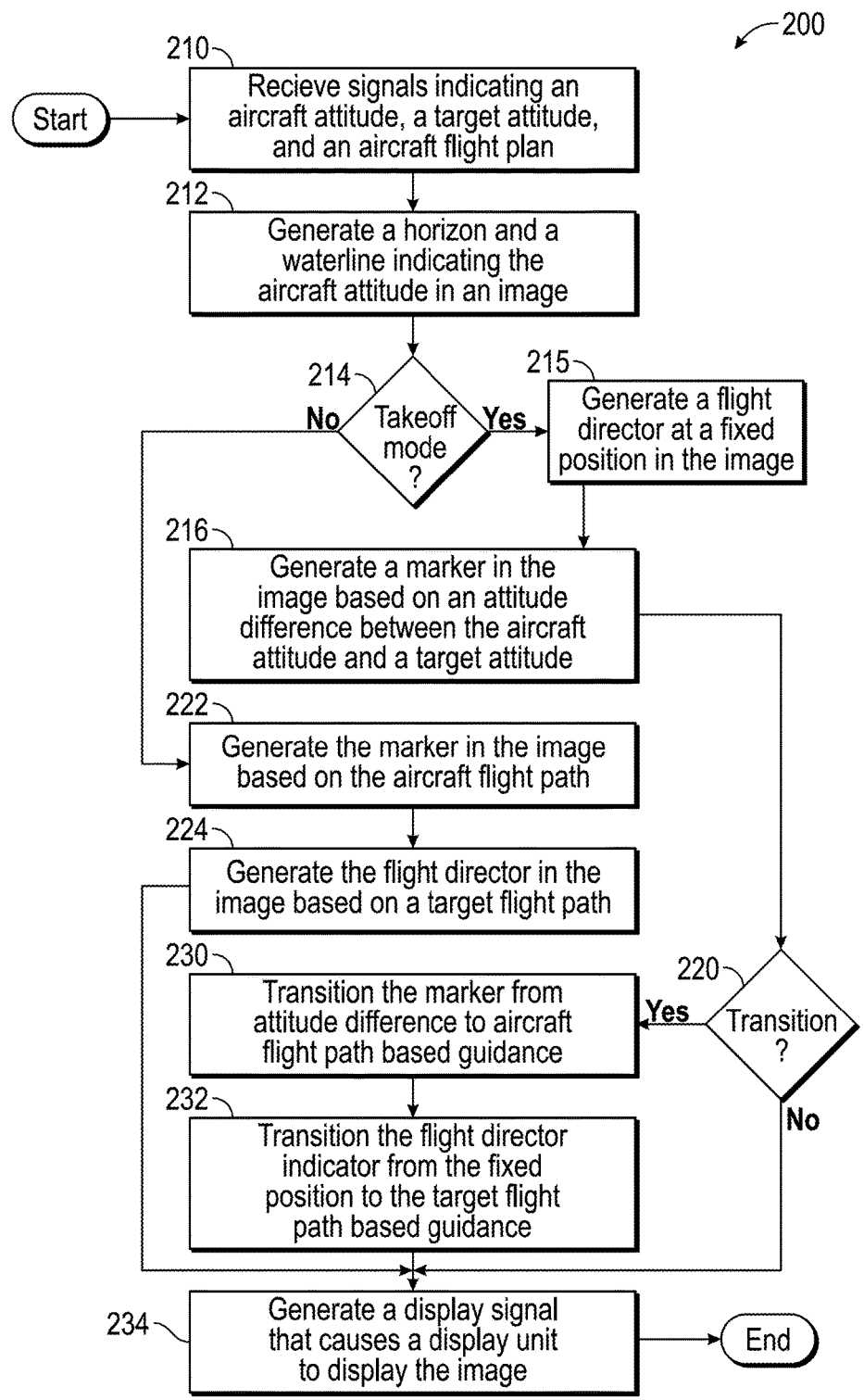
FIG. 6 is a flow diagram illustrating a non-limiting embodiment of a method of providing flight director guidance to a pilot during a takeoff procedure in accordance with the teachings of the present disclosure.

As aircraft 100 ascends, flight director indicator 138 transitions from the fixed position to a position 182 corresponding to a flight path based guidance as indicated by movement arrow 184 of FIG. 5. Marker 134 similarly transitions from an attitude difference based position to a flight path based position.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An avionics system, comprising:
   a display unit configured to present an image;
   a controller communicatively coupled with the display unit and configured to control the display unit to present the image in a takeoff mode and in a flight mode of the controller, the controller further configured to:
   receive signals indicating an aircraft attitude, a target attitude, and an aircraft flight path;
   generate a marker in the image in the takeoff mode based on an attitude difference between the aircraft attitude and the target attitude;
   generate the marker in the image in the flight mode based on the aircraft flight path; and
   generate a signal that causes the display unit to present the image.

2. The avionics system of claim 1, wherein the controller is further configured to generate a flight director indicator in the image in the takeoff mode in a fixed position and to generate the flight director indicator in the image in the flight mode based on a target flight path.

3. The avionics system of claim 1, wherein the controller is further configured to transition between the takeoff mode and the flight mode in response to at least one of a weight off wheels indication, an airspeed indication, and an altitude indication.

4. The avionics system of claim 1, wherein the controller is configured to generate the marker in the image in the takeoff mode in response to determining that a pitch rotation at takeoff has not yet occurred.

5. The avionics system of claim 1, wherein the controller is further configured to generate a waterline in the image indicating the aircraft attitude.

6. The avionics system of claim 5, wherein the controller is configured to generate the waterline based on the signals indicating the aircraft attitude and below the target attitude by a distance corresponding to the attitude difference.

7. The avionics system of claim 1, wherein the controller is configured to generate a flight director indicator at a fixed position in the image based on a minimum takeoff gradient.

8. The avionics system of claim 7, wherein the controller is configured to generate the marker in the image in the takeoff mode below the flight director indicator a distance corresponding to the attitude difference.

9. A controller for an avionics system, the controller comprising:
a processor; and
a memory unit operatively coupled with the processor, the memory unit having instructions, the instructions and the processor cooperating to configure the controller to control a display unit to present an image in a takeoff mode and in a flight mode of the controller, and to:
receive signals indicating an aircraft attitude, a target attitude, and an aircraft flight path;
generate a marker in the image in the takeoff mode based on an attitude difference between the aircraft attitude and the target attitude;
generate the marker in the image in the flight mode based on the aircraft flight path; and
generate a signal that causes the display unit to present the image.

10. The controller of claim 9, wherein the instructions and the processor further configure the controller to generate a flight director indicator in the image in the takeoff mode in a fixed position and to generate the flight director indicator in the image in the flight mode based on a target flight path.

11. The controller of claim 9, wherein the instructions and the processor further configure the controller to transition between the takeoff mode and the flight mode in response to at least one of a weight off wheels indication, an airspeed indication, and an altitude indication.

12. The controller of claim 9, wherein the instructions and the processor further configure the controller to generate the marker in the image in the takeoff mode in response to determining that a pitch rotation at takeoff has not yet occurred.

13. The controller of claim 9, wherein the instructions and the processor further configure the controller to generate a waterline in the image indicating the aircraft attitude.

14. The controller of claim 13, wherein the instructions and the processor further configure the controller to generate the waterline below the target attitude by a distance corresponding to the attitude difference.

15. The controller of claim 9, wherein the instructions and the processor further configure the controller to generate a flight director indicator at a fixed position in the image based on a minimum takeoff gradient.

16. The controller of claim 15, wherein the instructions and the processor further configure the controller to generate the marker in the image in the takeoff mode below the flight director indicator a distance corresponding to the attitude difference.

17. An aircraft, comprising:
an aircraft control handle configured to receive control movements for attitude adjustment in the aircraft;
a display unit configured to present an image; and
a controller communicatively coupled with the display unit and the aircraft control handle, the controller and configured to control the display unit to present the image in a takeoff mode and in a flight mode of the controller, the controller further configured to:
receive signals indicating an aircraft attitude, a target attitude, and an aircraft flight path;
generate a marker in the image in the takeoff mode based on an attitude difference between the aircraft attitude and the target attitude;
generate the marker in the image in the flight mode based on the aircraft flight path; and
generate a signal that causes the display unit to present the image.

18. The aircraft of claim 17, wherein the controller is further configured to generate a flight director indicator in the image in the takeoff mode in a fixed position and to generate the flight director indicator in the image in the flight mode based on a target flight path.

19. The aircraft of claim 17, wherein the controller is configured to generate a flight director indicator at a fixed position in the image based on a minimum takeoff gradient.

20. The aircraft of claim 19, wherein the controller is configured to generate the marker in the image in the takeoff mode below the flight director indicator a distance corresponding to the attitude difference.

* * * * *